United States Patent [19]
Ward et al.

[11] Patent Number: 6,167,058
[45] Date of Patent: Dec. 26, 2000

[54] MEDIA ACCESS CONTROL PROTOCOL

[75] Inventors: Christopher Ward, Glen Ridge; William Edward Stephens, Belle Mead; Miroslaw Kalinowski, Princeton, all of N.J.

[73] Assignee: Sarnoff Corporation, Princeton, N.J.

[21] Appl. No.: 09/027,602

[22] Filed: Feb. 23, 1998

Related U.S. Application Data

[60] Provisional application No. 60/038,928, Feb. 24, 1997.

[51] Int. Cl.[7] .................................................. H04L 12/413
[52] U.S. Cl. ........................................... 370/445; 370/487
[58] Field of Search .................................... 370/445, 487; 455/16, 348

[56] References Cited

U.S. PATENT DOCUMENTS

| | | | |
|---|---|---|---|
| 4,516,239 | 5/1985 | Maxemchuk | 370/85 |
| 5,444,696 | 8/1995 | Petranovich | 370/17 |
| 5,586,121 | 12/1996 | Moura et al | 370/404 |
| 5,978,650 | 11/1999 | Fischer et al. | 455/16 |

*Primary Examiner*—Salvatore Cangialosi
*Attorney, Agent, or Firm*—William J. Burke

[57] ABSTRACT

A media access control protocol methodology suitable for facilitating client-server interaction in an asymmetric information distribution system, especially an asymmetric information distribution system offering multiple information services.

13 Claims, 7 Drawing Sheets

MEDIA ACCESS CONTROL PROTOCOL

This application claims benefit of U.S. provisional patent application 60/038,928 filed Feb. 24, 1997.

The invention relates to communications systems in general and, more particularly, the invention relates to a media access control protocol methodology suitable for use in an asymmetric information distribution system.

BACKGROUND OF THE DISCLOSURE

Asymmetric information distribution systems are characterized by high capacity or high bandwidth downstream (i.e., server to client) communication channels and low capacity or low bandwidth upstream (i.e., client to server) communication channels. In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

Unfortunately, present asymmetric information distribution systems and, more particularly, data transfer protocol methodologies utilized by such systems, do not provide a sufficiently flexible solution to implementing a multiple information service (e.g., VOD, data network access, voice and the like) information distribution system.

To facilitate client-server interaction in an asymmetric information distribution system, especially an asymmetric information distribution system offering the such multiple information services, it is seen to be desirable to provide a data transfer protocol that allows flexible resource allocation, efficient data transfer and control operations and scalability.

SUMMARY OF THE INVENTION

The invention comprises a media access control protocol methodology suitable for facilitating client-server interaction in an asymmetric information distribution system, especially an asymmetric information distribution system offering multiple information services.

Specifically, the invention comprises a media access protocol method for use in an asymmetric information distribution system comprising a plurality of information channels, each information channel comprising a plurality of downstream slots and at least one upstream slot, each information channel in communication with one or more respective subscribers, the method comprising the steps of:

(a) receiving, via one or more of the information channel upstream slots, data from one or more subscribers; (b) determining, for each information channel providing data, if a data collision has occurred; (c) asserting, for each information channel having a data collision, a data collision indicium in a respective acknowledgment packet; (d) asserting, for each information channel providing a valid information frame, an acknowledgment indicium in a respective acknowledgment packet; and (e) transmitting, for each information channel via a respective one of the downstream slots, an information frame including data collision indicium and acknowledgment indicium associated with the information channel.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the invention can be readily utilized in any client-server information distribution system having one or more relatively high bandwidth downstream channels, where each channel is associated with a relatively low bandwidth upstream channel.

The inventive Media Access Control (MAC) methodology will be described within the context of an information distribution system in which, illustratively, fixed length MPEG 13818-1 transport stream transport packets are transported from a head end (i.e., server) to one or more uniquely identified subscribers (i.e., clients) via a high bandwidth (illustratively 27 Mbps) downstream channel. Subscriber information is transmitted to the head end via a relatively low bandwidth (illustratively 128 Kbps) upstream channel. The downstream and upstream channels may be carried by separate communications media, in mutually exclusive spectral regions of the same media, or in overlapping spectral regions of the same media using known spread spectrum techniques.

Figure 1:
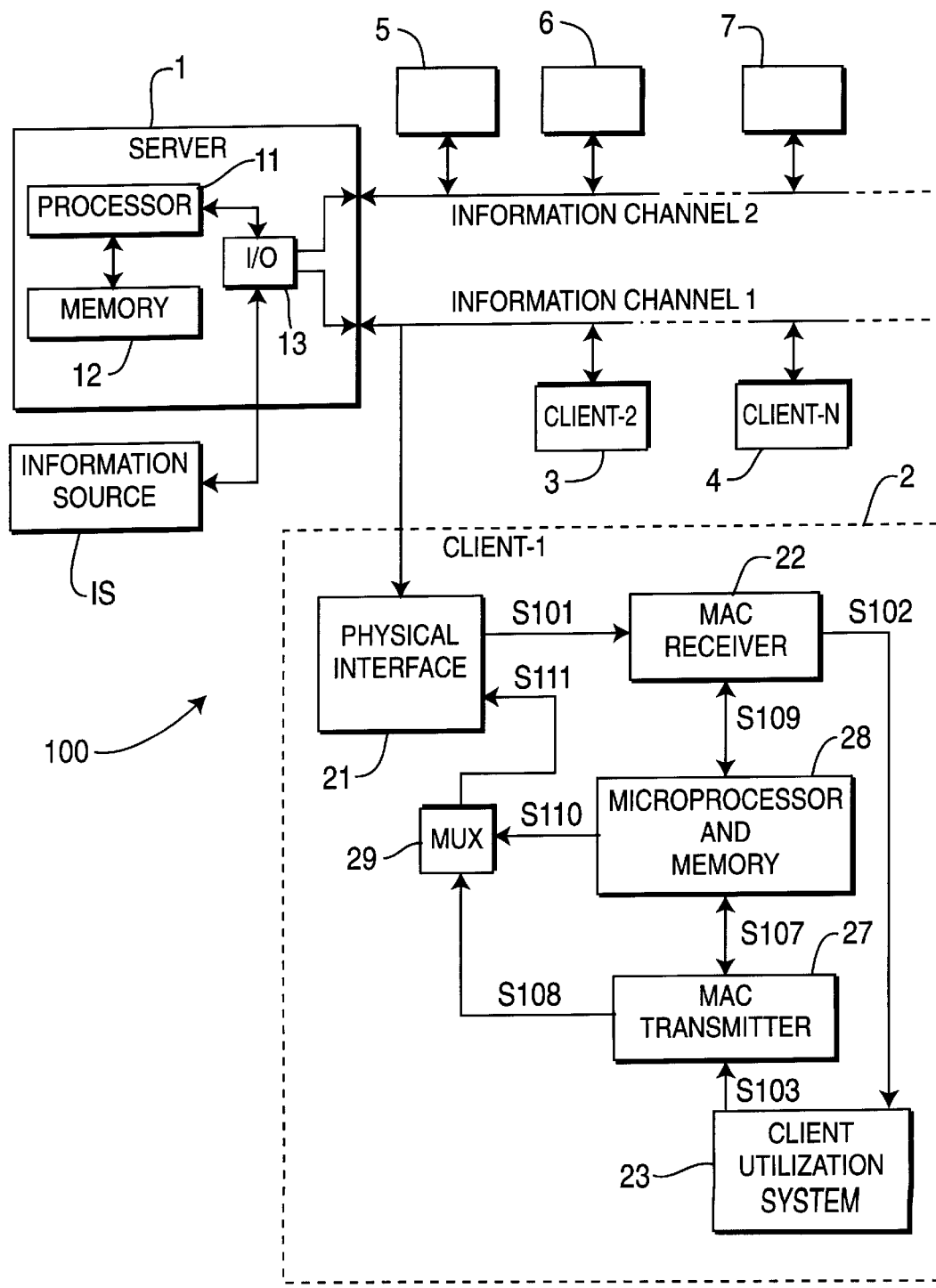
FIG. 1 depicts a client-server system including a media access control (MAC) layer according to the invention.

FIG. 1 depicts a client-server system 100, illustratively a mixed information service system comprising, illustratively, video-on-demand (VOD) and internet access services, including a media access control (MAC) layer according to the invention.

A server 1 includes a processor 11 that is coupled in a standard manner to a memory unit 12 and an input/output (I/O) controller 13. The I/O controller 13 is coupled to an information source IS, such as a video on demand (VOD) storage vault or an computer connected to a network such as the Internet (not shown). The server receives information for subsequent transmission to information consumers (i.e., subscribers) via one of a plurality of information channels, illustratively INFORMATION CHANNEL 1 and INFORMATION CHANNEL 2. The first information channel, INFORMATION CHANNEL 1, is coupled to a plurality of clients denoted as CLIENT-1 through CLIENT-N. Similarly, the second information channel, INFORMATION CHANNEL 1, is coupled to a plurality of clients denoted as 5 through 6. Each information channel comprises a relatively high bandwidth (e.g., 27 MHz) downstream channel and a relatively low bandwidth upstream channel (e.g., 128 Kbps).

Each client, illustratively CLIENT-1, which is denoted as 2, comprises a physical interface 21 that performs all the electrical functions associated with transferring data back and forth between the client 2 and the server 1. The physical interface coupled received data to a MAC receiver 22 via a signal path S101. The MAC receiver coupled information frames that are valid and properly addressed to a client utilization system 23, illustratively a video processing and display system (in the case of a VOD application). The client utilization system send server request and any other client to server data to a MAC transmitter 27 via a signal path S103.

A microprocessor and memory unit 28 coordinates the operation of the MAC receiver 22, the MAC transmitter 27 and a multiplexer 29. The MAC receiver 22 and MAC transmitter 27 operate in the manner described below with respect to FIGS. 2–9. The multiplexer 29 is used to selectively couple either the output of the MAC transmitter 27 (i.e., signal path S108) or an output of the microprocessor and memory unit 28 (i.e., signal path S110) to the physical interface 21 via a signal path S111.

The physical interface includes a link layer protocol that is based on the GoBackN protocol with N set to 64 (i.e. 6 bits), thereby permitting up to 63 packets to be transmitted prior to an acknowledgment of reception. The downstream MAC protocol is based on a single high speed (e.g., 27 Mbps) channel which contains data packets for many users and provides reliable packet delivery using an automatic repeat request (ARQ) algorithm.

The upstream protocol is a slotted collision detect protocol distributed over many low speed (128 Kbps) channels with explicit acknowledgment of packets. Again, the ARQ protocol used is GoBackN, with N set to 4 (i.e. 2 bits) thereby permitting up to three packets to be transmitted prior to an acknowledgment of reception. The upstream bandwidth is also managed by a head end-controlled bandwidth reservation system. This system permits the head end to reserve upstream slots for particular users and is used to improve protocol efficiency. The complete protocol is designed to be simple and flexible yet efficient.

Figure 2:
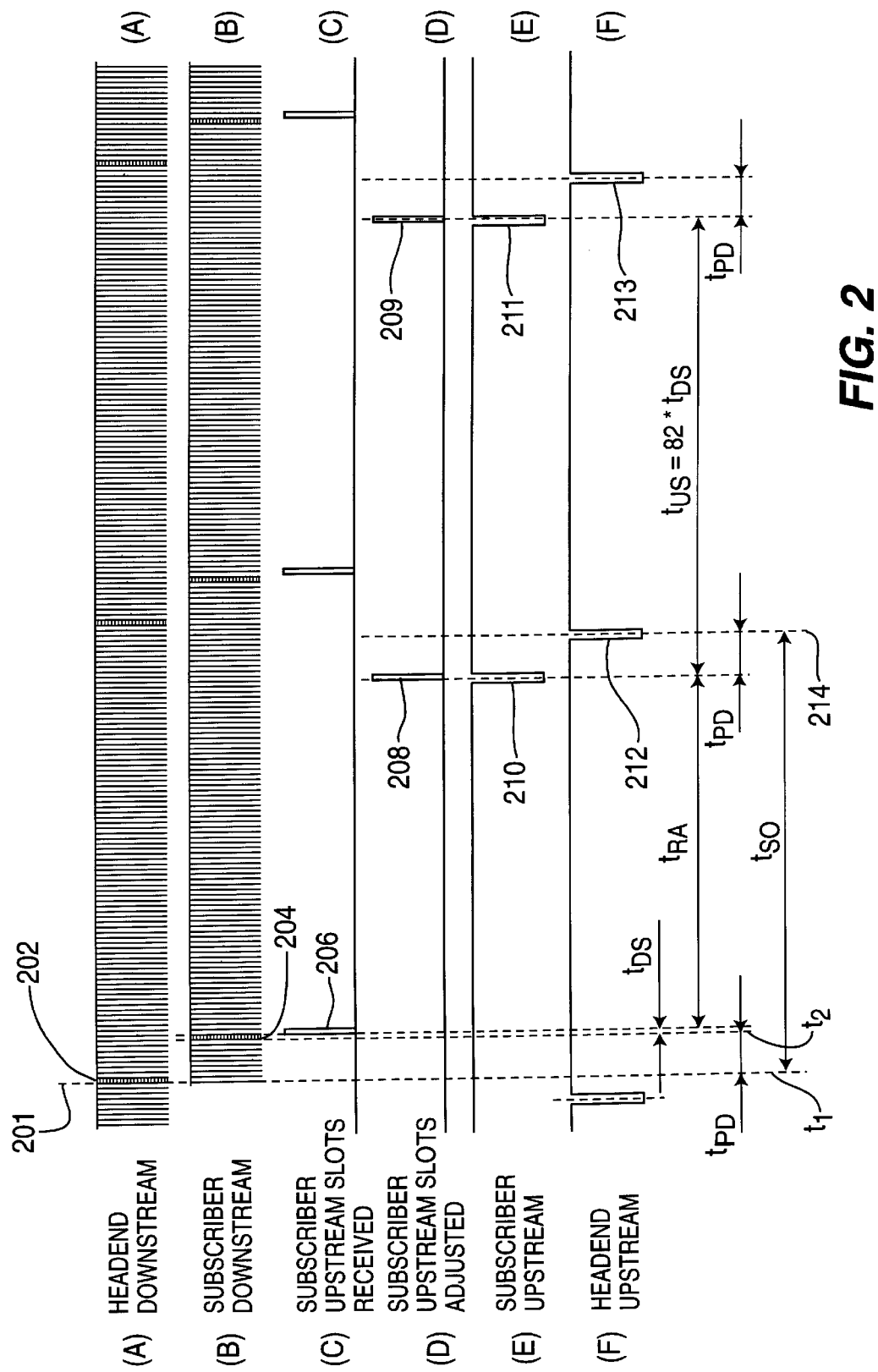
FIG. 2 depicts an operation and timing diagram of a media access control (MAC) protocol according to the invention and suitable for use in the client-server system of FIG. 1.

FIG. 2 depicts an operation and timing diagram of a media access control (MAC) protocol according to the invention and suitable for use in the client-server system of FIG. 1. The MAC protocol is an asymmetric protocol which uses, illustratively, fixed size MPEG 13818-1 transport stream transport packets on the downstream and short fixed size slots on the upstream. The downstream protocol is based on a single high speed (27 Mbps) channel which contains data packets for many users and provides reliable packet delivery using automatic repeat request (ARQ). The downstream link protocol used is based on the GoBackN protocol with N set to 64 (i.e. 6 bits). The upstream protocol is a slotted collision detect protocol distributed over many low speed (128 Kbps) channels with explicit acknowledgment of packets. Again, the ARQ protocol used is GoBackN, with N set to 4 (i.e. 2 bits). The upstream bandwidth is also managed by a head end-controlled bandwidth reservation system. This system permits the head end to reserve upstream slots for particular users and is used to improve protocol efficiency. The complete protocol is designed to be flexible and efficient.

It must be noted that a definite timing relationship is maintained between the downstream and upstream packets. In the exemplary embodiment, this timing relationship is 82:1. The downstream channel carries, illustratively, 188 byte packets at a corrected data transmission rate of 27 Mbps. The upstream channel carries, illustratively, 68 byte slots with additional preamble and guard bits to maintain the definite timing relationship.

Referring now to FIG. 2, six rows of timing information, denoted as rows A through F, are shown. The first row (A) illustrates the downstream packet sequence generated by a head end or server. The downstream packet sequence comprises two types of MPEG-2 transport packets, data transport packets and acknowledgment transport packets. Data transport packets are identified by a unique PID (e.g. 1), while acknowledgment transport packet is identified by a different unique PID (e.g. 2). The downstream data stream is composed of a sequence of 81 data transport packets followed by an acknowledgment transport packet as illustrated in FIG. 1–1. The acknowledgment slots, such as an acknowledgment slot 202, are shown in black. There is exactly one downstream acknowledgment packet in each upstream slot time. This acknowledgment packet is timed to be delivered somewhere in the middle of the upstream slot time and is used to provide a collision detection function for each of the upstream slot times. However, since this time reference will vary depending on the distance of the subscriber from the head end, the subscriber or client adapts its transmission slot to account for this delay.

The second row (B) illustrates the downstream packet sequence received by a subscriber or client. It must be noted that each transmitted slot is received by a client after a propagation delay of $t_{PD}$. For example, acknowledgment slot 202 is transmitted by the server at a time $t_1$ and received by the client at a time $t_2$. Moreover, each downstream slot is comprises $t_{DS}$ (downstream slot time) seconds. To determine the appropriate width of a slot, the subscriber measures the time required to receive the acknowledgment packet (i.e., $t_{DS}$) and uses this measurement as a timing mark or reference for range adjustment and other timing operations.

The third row (C) illustrates the subscriber reception 206 of the acknowledgment slot 202 shown in the second row (B). The subscriber measures the time required to receive the entire acknowledgment packet (i.e., the subscriber determines the duration of a downstream slot $t_{DS}$).

The fourth row (D) illustrates a temporal adjustment the location of a subscriber's upstream slot using the measured downstream slot (i.e., $t_{DS}$). It must be noted that the subscriber's upstream slot is adjusted such that the downstream acknowledgment packet from the head end is received during the upstream slot time. In this manner, a collision detected at the head end may be transmitted to the subscriber immediately. This timing arrangement is possible because the downstream communication channel is much faster than the upstream channel.

The fifth row (E) shows an upstream slot 210 that is utilized by the subscriber to transmit upstream data. Since the upstream slot size is determined by the definite timing relationship maintained between the downstream and upstream packets, the time to transmit the upstream slot, i.e. $t_{US}$ (upstream slot time) is defined by $t_{DS}$. The upstream slot is defined as a slot temporally offset by a range adjustment time ($t_{RA}$) from the end of a received acknowledgment packet If the subscriber has any data to transmit, and the slot has not been reserved for another subscriber, the subscriber may attempt to send an upstream slot 210 or 211.

Row 6 (F) illustrates the reception, after a propagation delay $t_{PD}$, of upstream slots 212 and 213 (which correspond to respective transmitted slots 210 and 211 of row 5). Since the upstream slot size is determined by a fixed ratio (illustratively 82:1), the time to transmit the upstream slot, i.e. tus (upstream slot time) is defined by $t_{DS}$, as previously discussed.

It is important to note that the location of the upstream slot is the same for each subscriber in the system. This is to ensure that either a packet transmitted upstream is received by the head end during the fixed slot time, or that one or more packets collide in a synchronized manner at the head end. In the case in which collision occurs, all packets are assumed to be lost. Packet collision is detected by a failure to recognize a packet and is optionally aided by using a cyclical redundancy check (CRC) at the head end.

Figure 3:
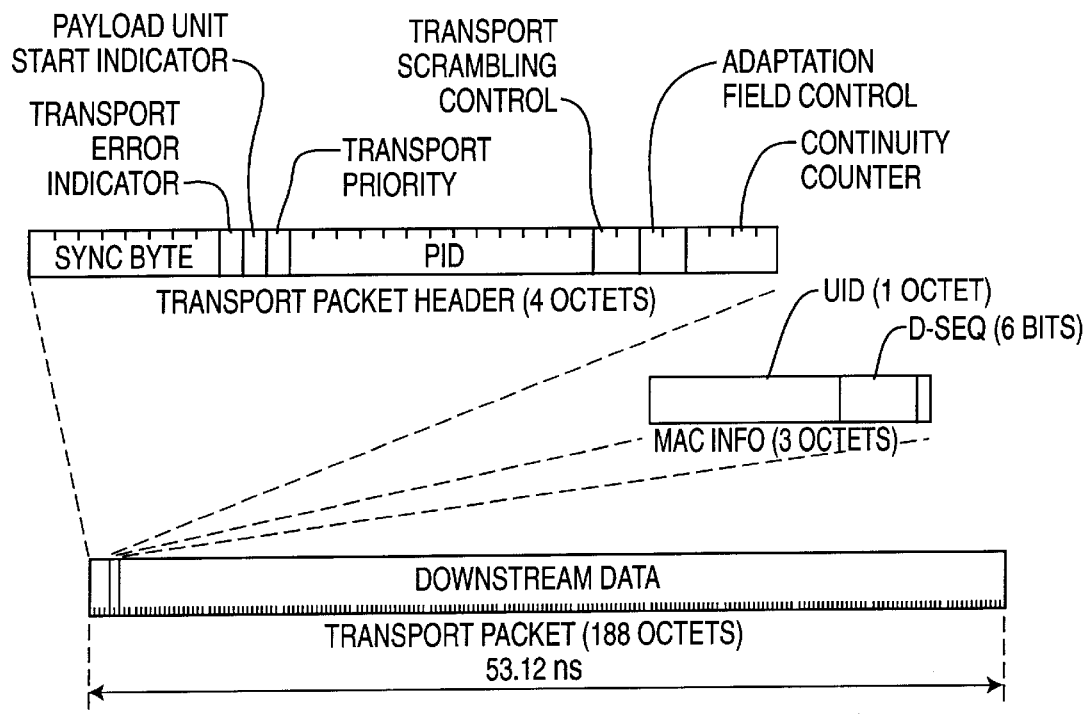
FIG. 3 depicts a data structure suitable for use as a packet format for downstream data packets in an information distribution system utilizing a (MAC) protocol according to the invention.

Each subscriber in the system performs a ranging adjustment to ensure that the location of the upstream slot is correct. The ranging adjustment is performed by measuring the time required to receive an entire acknowledgment packet (i.e., measuring $t_{DS}$) and adjusting the predefined upstream slot allocation FIG. 3 depicts a data structure suitable for use as a packet format for downstream data packets in an information distribution system utilizing a (MAC) protocol according to the invention. Specifically, FIG. 3 depicts a transport packet data structure suitable for use as the packet format of downstream data packets in an asymmetrical information distribution system such as the system 100 depicted in FIG. 1. The exemplary frame format comprises an enhanced MPEG 13818-1 transport packet format. A standard MPEG 13818-1 transport packet typically has a fixed size (188 bytes) and contains the 4 byte header. In general, MPEG transport packet PIDs are used to indicate program content including video and audio streams. However, to reduce conflicts with video programming identifications, only two PIDs will be used in the exemplary transport packets. The first PID indicates that the packet is a "normal" downstream data packet. The second PID indicates that the packet is a downstream acknowledgment packet. The use of the downstream information packet will be described in more detail below with respect to FIGS. 3, 6 and 7.

An exemplary enhanced MPEG 13818-1 transport packet format includes two additional fields located immediately after the standard transport packet header fields. The two fields comprise a User Identification (UID) field and a Downstream Sequence Number (D-Seq) field.

The User Identification (UID) field is a 12 bit field containing a unique user identification number that is used to associate the packet with a particular subscriber or client. Each subscriber or client is assigned a unique UID number for the channel in which it resides. The UID is used in all dialogues between the head end and the subscriber box. Optionally, a mapping between the UID and other subscriber identification numbers, such as Ethernet MAC address, IP address, or subscriber billing number may be utilized. The UID has a context only between the head end and the subscriber boxes and is otherwise transparent. it should be noted that if a subscriber unit is reassigned to a new channel due to, e.g., an increase in system loading, the subscriber unit will receive a new UID.

The Downstream Sequence Number (D-Seq) is a 6 bit field that is used to permit multiple unacknowledged frames to be maintained in the upstream transmission buffer of a subscriber. In this manner, a subscriber may receive and store up to, illustratively, 63 packets without sending a downstream acknowledgment (D-ACK) to the head end. It must also be noted that since a subscriber may only receive, e.g., 63 packets without sending a D-ACK, the bandwidth demands placed on the downstream by the subscriber cannot exceed the demands of 63 packets per D-ACK.

Figure 4:
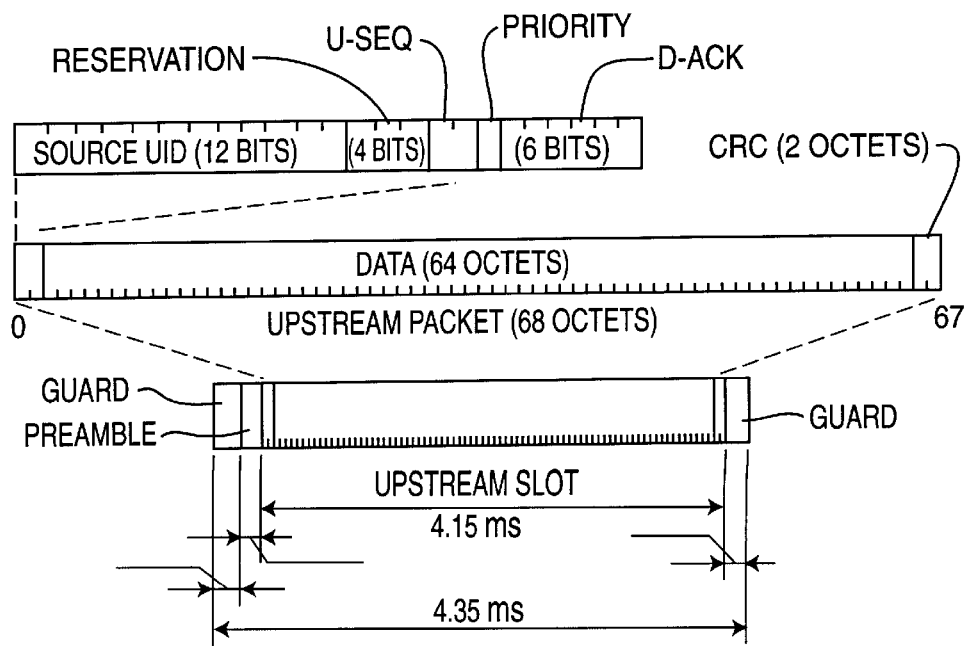
FIG. 4 depicts a data structure suitable for use as a packet format for upstream data packets in an information distribution system utilizing a (MAC) protocol according to the invention.

FIG. 4 depicts a data structure suitable for use as a packet format for upstream data packets in an information distribution system utilizing a (MAC) protocol according to the invention. Specifically, FIG. 4 depicts a transport packet data structure suitable for use as the packet format of upstream data packets in an asymmetrical information distribution system such as the system 100 depicted in FIG. 1.

The upstream data frame format has a frame length that is defined to be some integer number of downstream packets and is synchronized to the downstream packet rate. For this exemplary system of FIG. 1, the ratio is 81:1. The upstream transport packet comprises nine fields as follows:

First, a guard field having a variable number of bits is used to ensure appropriate spacing between slots. Second, a 16-bit preamble field having an illustrative form of "01010101 01 111110" is used by the head end receiver to synchronize the incoming packet. Third, a 12-bit source user identification (UID) field is used to indicate the source User Identification number. Fourth, a 4-bit reservation field is used to provide reservation information, as will described in more detail below with respect to FIG. 5. Fifth, a 2-bit Upstream Sequence Number (U-Seq) field is used to permit multiple unacknowledged frames to be maintained in the head end transmission buffer. The protocol used with the U-Seq field is GoBackN. Sixth, a 1-bit priority field is used to indicate the message priority to the head end receiver. Seventh, a 6-bit acknowledgment (D-ACK) field is used by the head end MAC layer to determine if a subscriber-received downstream data packet is out of sequence. The protocol used (in conjunction with the D-SEQ field) is GoBackN. Eighth, a 64-byte data field is used to carry data to the head end receiver. Ninth, a 16-bit cyclic redundancy check (CRC) field is used to permit the head end receiver to determine if an incoming packet is in error. It is recommended that CCITT-16 be used.

Figure 5:
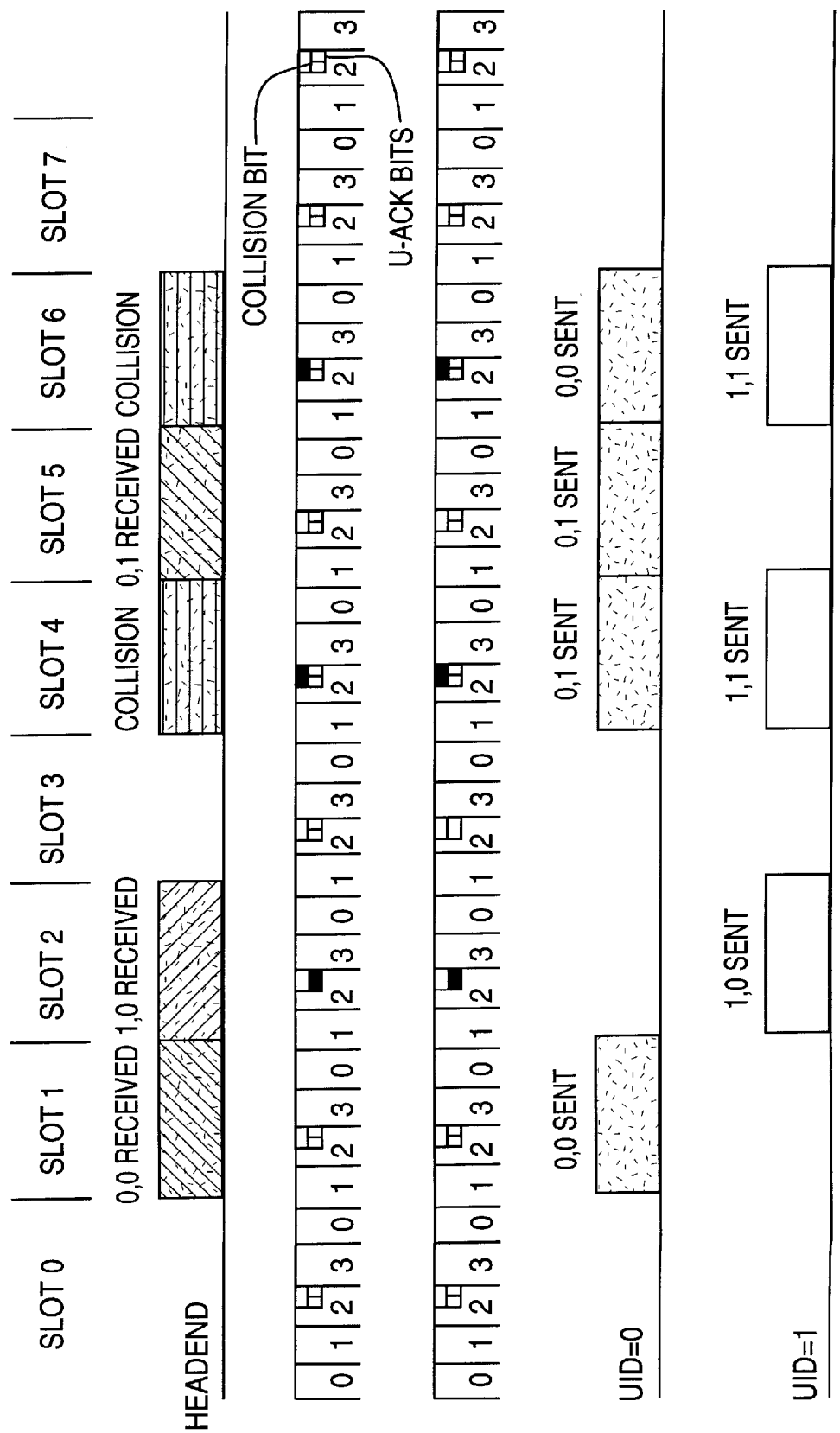
FIG. 5 depicts a simplified timing diagram useful in understanding the operation of a collision and acknowledgment aspect of the invention.

FIG. 5 depicts a simplified timing diagram useful in understanding the operation of a collision and acknowledgment aspect of the invention. Specifically, FIG. 5 depicts a simplified timing diagram illustrative of ACK and collision bits usage in the case two subscribers sending data during the same and during different upstream time slots. It must be noted that the inventive protocol methodology is not technically a carrier sensed protocol. However, the inventive protocol methodology does, nevertheless, provide an efficient mechanism for ensuring that subscribers are aware when a collision has taken place. As previously mentioned, there is exactly one downstream acknowledgment packet in each upstream slot time. This packet is timed to be delivered somewhere in the middle of the upstream slot time (although this time reference will vary depending on the distance of the subscriber from the head end) and is used to provide a collision detection function for each of the upstream slot times. Thus by inspecting the downstream Collision Indication in the slot immediately following an upstream transmission, the subscriber is able to determine if an upstream packet was received by the head end.

FIG. 5 shows the use of a single ACK bit and collision bit as they relate to two subscriber units on the same channel (though the particular channel used is not relevant). The ACK and collision bits form part of the downstream acknowledge packet. The two example subscriber units are UID=0 and UID=1. To simplify the discussion, a ratio between upstream and downstream slots of only one to four is illustrated. Thus, for every four downstream time slots there exists one upstream time slot.

Referring now to FIG. 5, eight upstream time slots denoted as slot 0 through slot 7 are shown. Activity occurring within each upstream slot is depicted with respect to the five rows shown in FIG. 5. The first row depicts data reception activity at the head end or server, such as valid data reception or data collision. The second and third rows depict the status of the ACK and collision bits of the acknowledge packet received by, respectively, the first subscriber (UID=0) and the second subscriber (UID=1). It should be noted that both subscribers receive the same information. The fourth and fifth rows depict data transmission activity of, respectively, the first subscriber (UID=0) and the second subscriber (UID=1).

It should be noted that asserting ACK, i.e., indicating that an information frame was properly received, comprises the changing the state of the ACK bit. In the case of a plurality of ACK bits (i.e., an ACK field), asserting ACK comprises incrementing the ACK field. This type of ACK functionality applied to head end or server acknowledgments of an upstream information frame (i.e., a U-ACK), and to subscriber or client acknowledgments of a downstream information frame (i.e., a D-ACK).

Upstream slot 0 shows neither subscriber unit using the upstream channel. As such, the acknowledge packet received during the next slot (slot 1) includes a clear ACK bit and a clear collision bit. Upstream slot 1 shows only UID=0 sending a frame. As such, the acknowledge packet received during the next slot (slot 2) includes an asserted (set) ACK bit and a clear collision bit. Upstream slot 2 shows only UID=1 sending a frame. As such, the acknowledge packet received during the next slot (slot 3) includes an asserted (cleared) ACK bit and a clear collision bit. Upstream slot 3 shows neither subscriber using the channel, however, since the collision bit is not set, UID=1 is advantageously made aware that the upstream packet was received by the head end without collision. As such, the acknowledge packet received during the next slot (slot 3) includes a non-asserted (clear) ACK bit and a clear collision bit.

Upstream slot 4 shows both UID=0 and UID=1 attempting to send data, which results in a collision at the head end. As such, the acknowledge packet received during the next slot (slot 5) includes a set ACK bit and a set collision bit. Upstream slot 5 shows UID=0 sending a frame, however, both subscribers are advantageously made aware of the previous collision. Upstream slot 6 shows both subscribers UID=0 and UID=1 attempting to send another frame. As such, the acknowledge packet received during the next slot (slot 7) includes a set ACK bit and a set collision bit, making both subscribers immediately aware of the collision. In addition, UID=0 is aware that its previous frame transmission was received correctly.

Figure 6:
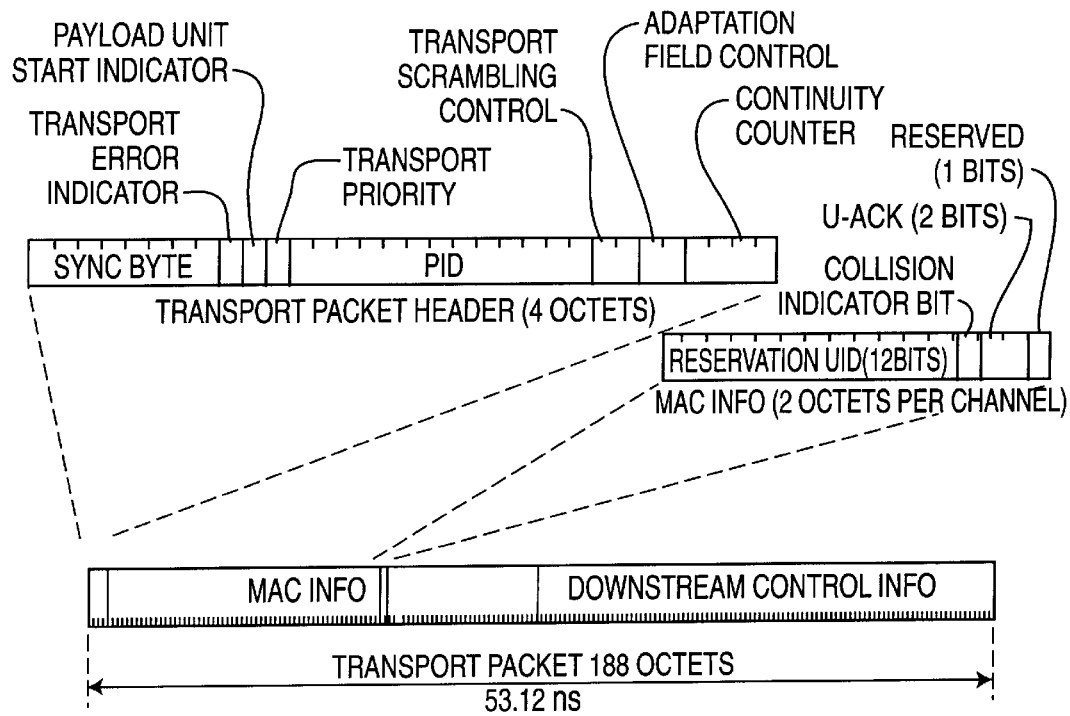
FIG. 6 depicts a data structure suitable for use as a packet format for downstream acknowledgment packets in an information distribution system utilizing a MAC protocol according to the invention.

FIG. 6 depicts a data structure suitable for use as a packet format for downstream acknowledgment packets in an information distribution system utilizing a (MAC) protocol according to the invention. Specifically, FIG. 6 depicts a transport packet data structure suitable for use as the packet format of a downstream acknowledgment packet (i.e., acknowledgment frame) format in an asymmetrical information distribution system according to the invention. The acknowledgment frame is identified by the PID in the transport packet header being set to, e.g., PID=2. The frame is divided into two parts, a MAC information portion and a control information portion. The MAC information portion is shown in more detail in FIG. 6, while the control information portion is shown in more detail in FIG. 7.

The MAC information portion of the acknowledgment frame is used for MAC protocol collision and acknowledgment for each of the downstream channels under control by the head end as described above with respect to FIG. 5. Thus, each upstream channel is mapped into a particular pair of bytes in the MAC information portion. The first pair of bytes corresponds to channel 0, the second pair to channel 1, and so on. For each channel mapped into the MAC information portion, the following four fields are utilized:

The first field is a 12-bit reservation user identification (UID) field that is used by the downstream to indicate which IUD is permitted to use the next upstream slot on that channel. The second field is a 1-bit collision indicator that, when set, indicates that an upstream collision occurred during the preceding upstream time slot. The third field is a 2-bit upstream acknowledgment (U-ACK) field that is used by the subscriber MAC layer to identify when upstream data is out of sequence. The protocol used (in conjunction with the U-SEQ field) is GoBackN. The fourth field is a 1-bit field that is reserved for future use.

Figure 7:
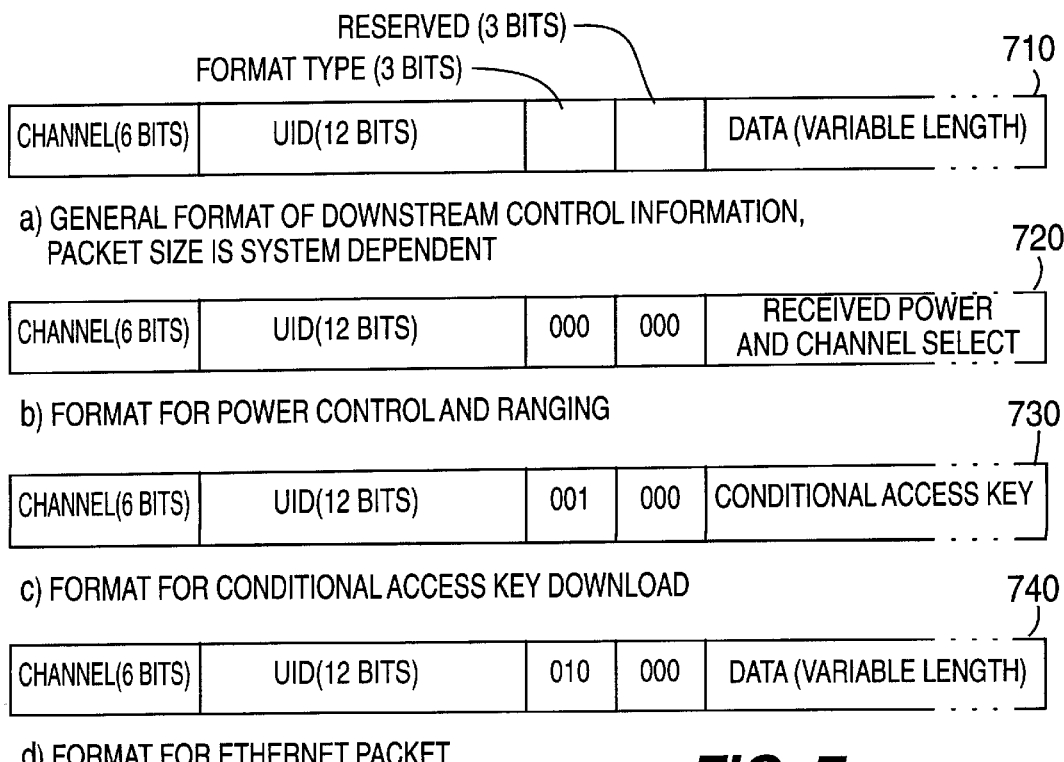
FIG. 7 depicts a data structure suitable for use as a control information portion of the downstream acknowledgment packet of FIG. 6.

FIG. 7 depicts a data structure suitable for use as a control information portion of the downstream acknowledgment packet (i.e., acknowledgment frame) of FIG. 6. The control information portion is used to provide downstream control information such as system configuration, ranging, power control, conditional access keys and the like. The control information portion is also used to provide downstream data for, e.g., Video On Demand control services, other downstream data services such as internet services or other information network services. All control frames have a common format as indicated in FIG. 7, but otherwise have local significance.

FIG. 7 shows the a general data structure format 710 and three defined formats 720, 730 and 740. The first format 720 is indicated by the format field containing a 000, and is used for downstream ranging and power control information, including operations such as UID assignment. The second format 730 is indicated by the format field containing a 001, and is used for downstream conditional access key download. A packet according to the second format is assumed to contain a key which is used to enable the set top box to receive a particular video channel (as identified by the transport PIDs). The third format 740 is indicated by the format field containing a 010, and is used to convey downstream Ethernet packets. A packet according to the third format is used for VOD services which require general data transfer capabilities. In one embodiment of the invention, the subscriber unit(s) include an Ethernet-aware protocol stack for this environment. it should be noted that other frame formats may be defined as required.

The data structures depicted in FIG. 7 have the following four fields in common: First, a 6-bit channel field that indicates the channel to which this downstream control packet refers. Each Subscriber Unit is in one and only one channel, thus, if the Channel number and UID match, the packet is destined for the indicated subscriber unit. Second, a 12-bit user identification (UID) field, Third, a 3-bit format type field that is used to identify which of a number of different frame formats are supported. The particular format to be decoded by the subscriber(s) is identified by this field. Fourth, a 4-bit field that is reserved for future use. It is critical to the understanding of the invention to note that FIG. 5 depicts only two subscribers utilizing the same information channel. However, the above-described use of the ACK and collision bits does not change even if many more subscribers are utilizing the same information channel. Moreover, the MAC protocol methodology provides for an extremely flexible system that can accommodate many information channels, each communicating with many respective subscribers via a plurality of respective downstream slots and a single respective upstream slot. In such a multiple information channel information distribution system, the 6-bit channel field of the data structures depicted in FIGS. 6 and 7 are utilized to identify which of the many information channels is receiving a particular data or acknowledgment packet. In addition, an acknowledgment packet directed to a particular channel contains all the information necessary to support the MAC protocol for each subscriber or client communicating via that channel.

In one embodiment of the invention an information distribution system comprising a Multipoint Microwave Distribution System (MMDS) includes a predetermined number of information channels. Each information channel communicates with a respective plurality of subscribers or clients by, e.g., 30 downstream video slots, one downstream data/control slot, and one upstream slot. The inventive MAC protocol is very flexible in terms of resource allocation and associated traffic monitoring functions. In this embodiment, the MAC protocol is used to adapt the allocation of, e.g., upstream slots to subscribers or clients based on predicted or measured usage and loading patterns.

Figure 8:
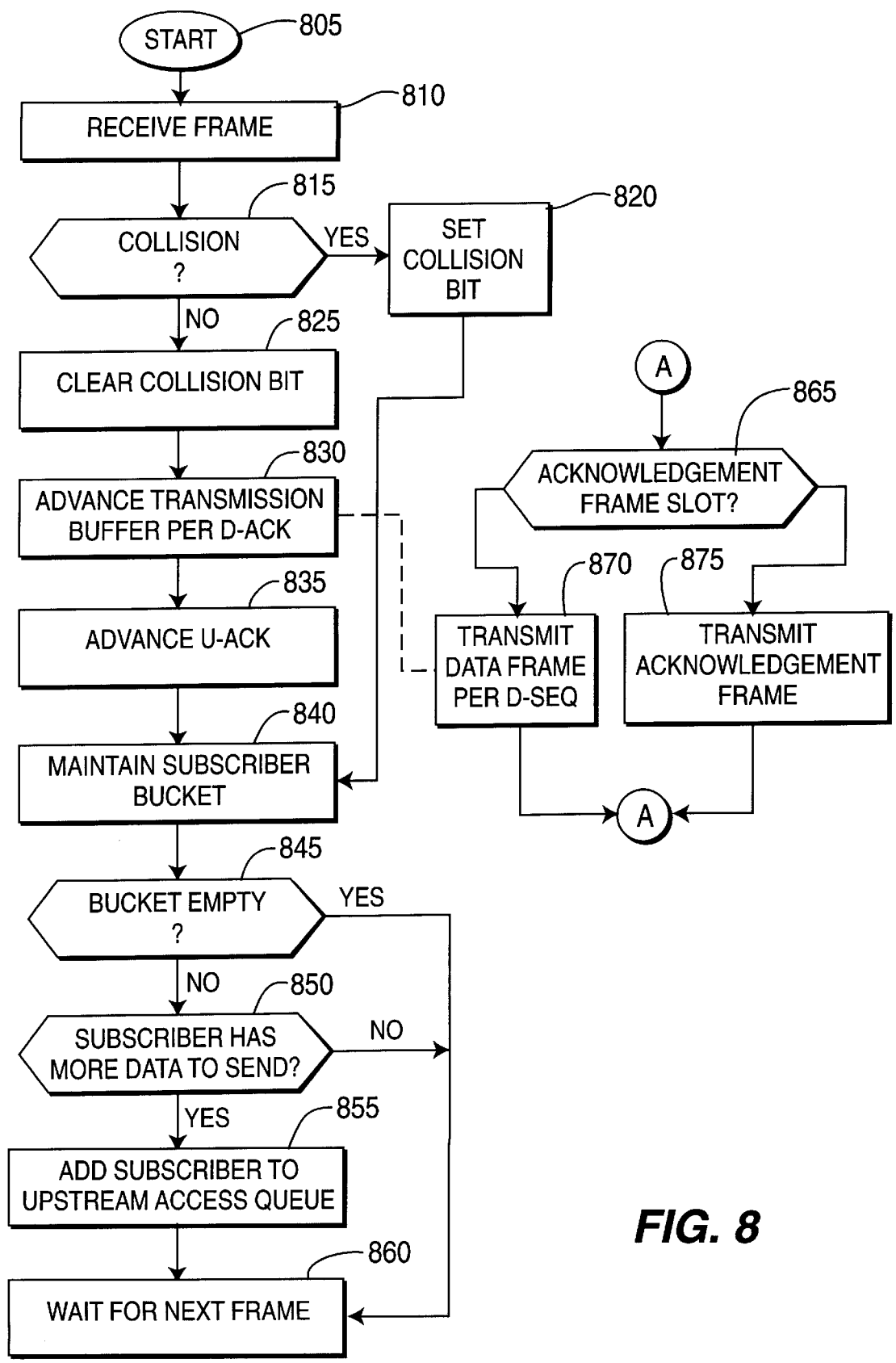
FIG. 8 depicts a flow diagram of a head end or server data processing routine utilizing a MAC protocol according to the invention.

FIG. 8 depicts a flow diagram of a head end or server data processing routine utilizing a MAC protocol according to the invention. The routine 800 of FIG. 8 includes a reservation routine (steps 840 through 855) suitable for use in the MAC protocol methodology. It is important to note that the number of bytes available for downstream control data is defined by the number of upstream channels being used. Thus, it is desirable to permit maximum control of the bandwidth by the head end. The reservation routine provides such head end bandwidth control without requiring excessive complexity in subscriber or client equipment.

Referring now to FIG. 6, each downstream channel is identified by a reservation user identification (UID). This reservation UID is used by the head end to indicate to the subscriber units assigned to a particular upstream channel which unit is to transmit in the following upstream time slot. The protocol works as follows. Each time a subscriber sends an upstream frame it includes in this frame a four bit indication of additional upstream frames that it has remaining to transmit (e.g., zero =0 frames left to send, 15=15+ frames left to send), using the reservation field described above with respect to FIG. 4.

If the subscriber's data is received (i.e., subscriber receives set U-ACK bit), the subscriber must then wait to be allocated a slot by the head end, even if the channel is idle. The head end is therefore in a position to maintain an estimation of the number of frames buffered in each subscriber unit and use this information to optimize the upstream bandwidth. In particular the head end is able to keep track of subscriber upstream data usage and demands and constrain subscriber units as appropriate using a suitable load leveling algorithm.

One suitable load leveling algorithm for use by the head end or server in a system according to the invention is based on restricting the downstream flow to subscriber units utilizing a "leaky bucket" traffic model. This traffic model allocates reservation slots to subscribers in a prioritized manner based on the relative fullness of the bucket. That is, as a subscriber transmits data to the head end the amount of information (i.e., the fullness) in the bucket is decreased at a rate roughly corresponding to the upstream transmission rate. At the same time, each bucket is filled at a rate corresponding to an average subscriber servicing data rate. For example, if the average subscriber servicing rate is calculated to be 20 Kbps, then each bucket is incremented by 20 counts each second. Similarly, if the upstream transmission rate is 128 Kbps, the bucket associated with a subscriber transmitting information upstream is decremented by 128 counts for each second of transmission. In the case of an upstream slot of a time duration $t_{US}$, the bucket is decremented by 128 divided by the portion of one second represented by $t_{US}$. The process of maintaining the buckets comprises the steps of filling and emptying the buckets.

Whenever an upstream packet is correctly received by the head end, the bucket associated with the transmitting subscriber or client is drained at a rate of corresponding to the upstream data rate, illustratively 128 Kbps. If the upstream packet includes a reservation field indicating that the subscriber or client needs to send additional information frames, and the subscriber's bucket is not empty (indicating that the subscriber has been given a relatively large allocation of upstream data slots) then a reservation slot is put in a round robin queue for access to the upstream bandwidth (i.e., slot) associated with the subscriber's information channel. This round robin queue is rotated through, with one unreserved slot always present. Thus, the number of elements in the queue corresponds to one more that the number of subscribers waiting to access the upstream slot of a particular channel. The UID at the head of this queue is then placed in the downstream ACK field, so that the subscriber corresponding to the UID will transmit an information frame during the next upstream slot.

The relative fullness or emptiness of the buckets provides an indication of the traffic loading dynamics of the network. Thus, as loading patterns become apparent (e.g., less upstream traffic in VOD applications than in internet browsing applications), the head end allocates additional resources, such as upstream slots or priority on existing slots, to those applications tending to require additional resources. Moreover, the parameters associated with assigning priority or round robin resources are adaptable to the information services or loading of a particular information channel. As such, the actual protocol to be used will vary as results from channel loading simulations and other simulations become available.

Although the protocol is the same for both Video on Demand and Data services, it exhibits different characteristics as indicated below. In particular, certain channels are typically designated as upstream (downstream) data channels and others as upstream (downstream) Video on Demand channels. Thus, a subscriber unit will be assigned to one or the other, but not both. However, it must be pointed out that the flexibility of the protocol does not preclude accessing data from a VOD channel, or video information from a data channel. It is simply the case that prolonged use of a channel for one type of service will result in statistical data that optimizes the protocol for that type of service.

For data services, bandwidth allocation is typically one downstream channel and 32 upstream channels. The downstream Transport Data/Acknowledgment Packets have a PID of either 1 or 2, and all subscriber units are typically tuned to the same downstream channel. Thus, the system is scaleable in the sense that the entire is simultaneously replaceable on multiple downstream/upstream channel sets. In the exemplary system of FIG. 1, the ACK packet (PID=2) must be transmitted every 82 transport packets in order for the upstream protocol to operate properly. Since the upstream bandwidth is significant, it is expected that many upstream channels will be assigned to data services and thus the number of channels represented in the downstream MAC information field will be large (perhaps 32) leaving little room for the Control Information field.

For VOD services, each downstream channel will be composed mainly of Video and Audio Transport Packets, however, the ACK packet (PID=2) is always required. As before the ACK packet (PID=2) must be transmitted every 82 transport packets in order for the upstream protocol to operate properly. In general the ACK packet will be used to provide the MOC functions and limited control functions as required for VOD services. With this in mind, typically only a few upstream channels are assigned to VOD services, and these will be used to accommodate a large number of simultaneous users. In a VOD service application using the exemplary system of FIG. 1, the number of channels represented in the downstream MAC Information field are small (perhaps only 4) leaving correspondingly more space for the Control Information. This space may be used to transmit general purpose Ethernet packets downstream if required. Notice that in this case the downstream data rate is limited to about 380 Kbps unless additional data transport packets are sent.

FIG. 8 depicts a flow diagram of a head end or server data processing routine 800 utilizing a MAC protocol according to the invention. The processing routine 800 comprises two simultaneously operating routines, namely a receiving routine (steps 805–860) and a transmitting routine (steps 865–875). It must be noted that the receiving routine (steps 805–860) and transmitting routine (steps 865–875) are shown as operating within the context of one or more communication channels. Thus, in the following description, subscriber interactions are performed using the subscriber identification and channel identification fields of the data structures previously described with respect to FIGS. 3,4,6 and 7.

The transmission routine is entered at step 865, where a query is made as to whether the present downstream slot associated with a particular channel is an acknowledgment frame slot. If the query at step 865 is answered affirmatively, then the routine 800 proceeds to step 875, where an acknowledgment frame is transmitted. If the query at step 865 is answered negatively, then the routine 800 proceeds to step 865, where a data frame is transmitted to a subscriber in accordance with the D-SEQ field associated with the subscriber.

The receiving routine 800 is entered at step 805, where the head end is waiting for an information frame to be received via one of the upstream time slots in one of the information channels. At step 810 the head end receives an information frame from a subscriber via the upstream slot of the information channel associated with the subscriber, and the routine 800 proceeds to step 815, where a query is made as to whether a collision has occurred.

If the query at step 815 is answered affirmatively, then the routine 800 proceeds to step 820, where a collision indication bit is set in an acknowledgment packet that will be transmitted to the information channel associated with the subscriber that send the information frame received at step 810. The routine 800 then proceeds to step 840.

If the query at step 815 is answered negatively, then the routine proceeds to step 825, where the collision indication bit of the respective acknowledgment packet is cleared. The routine 800 then proceeds to step 830, where the transmission buffer is advanced per the D-ACK message received from the subscriber. As previously discussed, the D-ACK indicates to the head end that the subscriber has successfully received the number of information frames indicated by the 6-bit D-ACK field. Thus, the head end may send additional frames to the subscriber. As previously discussed, the number of additional frames that may be sent to a subscribe is indicated by the D-SEQ field. Thus, the D-SEQ field associated with the subscriber in incremented according to the D-ACK information received from the subscriber. The relationship between D-ACK and D-SEQ is indicated by the dotted line between steps 830 and 870.

At step 830, a downstream sequence number (D-SEQ) is calculated and inserted into the acknowledgment packet that will be transmitted to the information channel associated with the subscriber of step 810. The routine 800 then proceeds to step 835, where the U-ACK associated with the transmitting subscriber is advanced. The routine 800 then proceeds to step 840.

At step 840, the bucket associated with the subscriber that sent the information frame received at step 810 is maintained. As previously discussed, a memory location representative of a bucket that is associated with the subscriber is incremented by a number indicative of an average data rate of upstream date transfer from the subscriber to the head end. Similarly, the bucket is decremented by a number indicative of the upstream data rate of the channel divided by the number of slots per second utilized by the channel, assuming only one upstream slot exists per each full complement of downstream slots.

The routine 800 then proceeds to step 845, where a query is made as to whether the bucket associated with the subscriber is empty. If the query at step 845 is answered negatively, then the routine proceeds to step 850, where a query is made as to whether the subscriber has more data frames to send. The number of data frames left to be sent by the subscriber is indicated by the number within a reservation field of the upstream packet. If the query at step 850 is answered negatively, or the query at step 845 is answered affirmatively, then the routine 800 proceeds to step 860, where the routine 800 waits for the next upstream information packet to be received.

Figure 9:
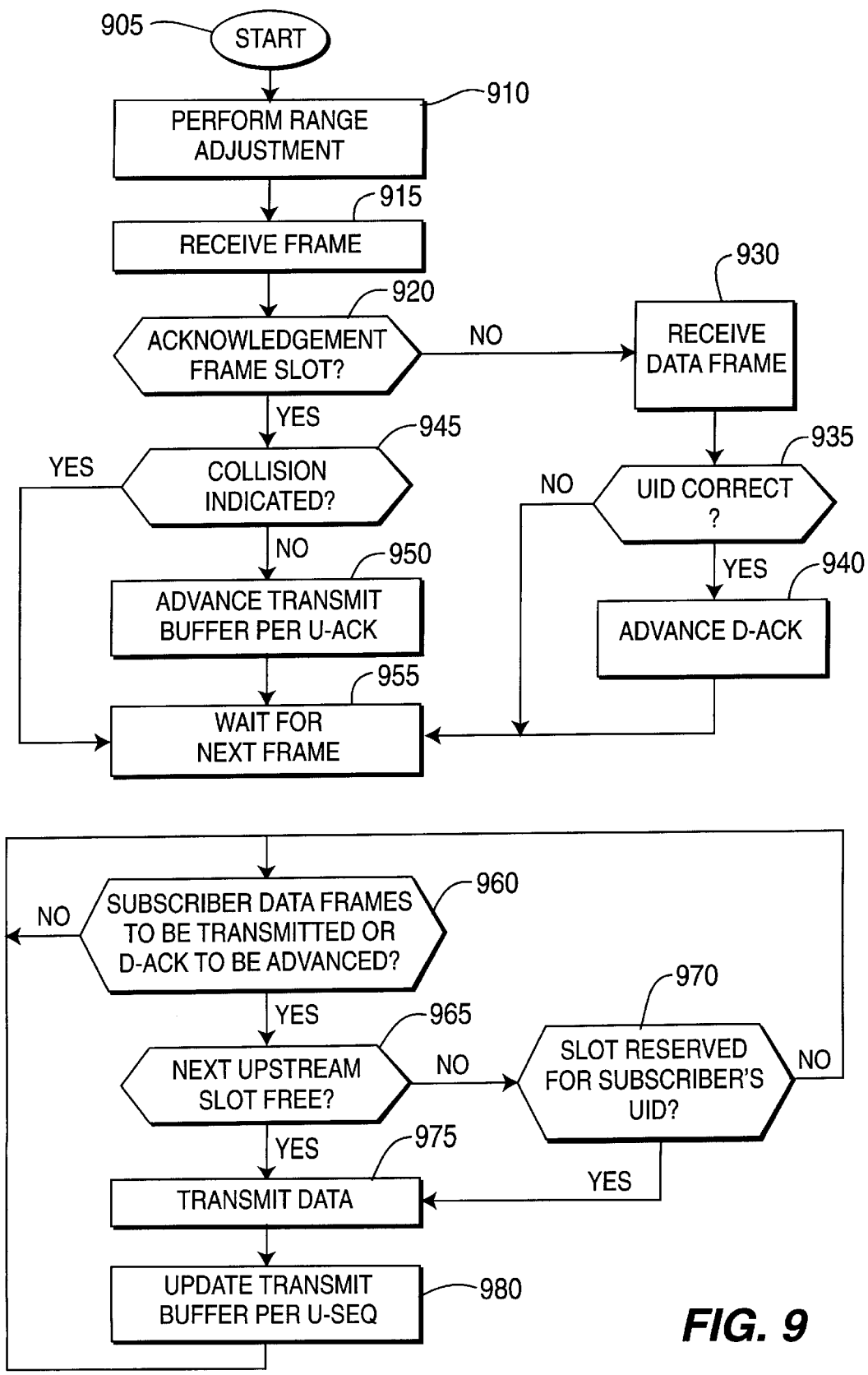
FIG. 9 depicts a flow diagram of a subscriber or client data processing routine utilizing a MAC protocol according to the invention.

FIG. 9 depicts a flow diagram of a subscriber or client data processing routine 900 utilizing a MAC protocol according to the invention. The processing routine 900 comprises two simultaneously operating routines, namely a receiving routine (steps 905–955) and a transmitting routine (steps 960–980).

The transmission routine (steps 960–980) is entered at step 960, where a query is made as to whether the subscriber has any data frames to be transmitted or if the D-ACK needs to be advanced. It must be noted that even if the subscriber has no information frames to be transmitted upstream, the subscriber must still periodically acknowledge its reception of information frames transmitted from the head end. If the query at step 960 is answered negatively, then the routine 900 proceeds to step 960, where the query is repeated. If the query at step 960 is answered affirmatively, then the routine 900 proceeds to step 965, where a query is made as to whether the next upstream slot is free.

If the query at step 965 is answered negatively, then the routine 900 proceeds to step 970, where a query is made as to whether the next upstream slot is reserved for the subscriber's UID. If the query at step 970 is answered negatively, then the routine 900 proceeds to step 960.

If either of the queries at steps 965 or 970 are answered affirmatively, then the routine 900 proceeds to step 975, where the data frame is transmitted, or the D-ACK is advanced. The routine 900 then proceeds to step 980, where the transmit buffer is updated per the U-SEQ field, and to step 960.

The receiving routine (steps 905–955) is entered at step 905, when a subscriber or client operating according to the routine is waiting to receive a downstream acknowledgment packet. When the acknowledgment packet is received, the routine 900 proceeds to step 910, where a ranging adjustment is performed. As previously discussed, the ranging adjustment comprises the steps determining the duration of the received acknowledgment packet and using that determined duration time to adjust the range time parameter that is used to identify temporal offset between the received acknowledgment packet and the upstream slot for the information channel. The routine then proceeds to step 915, where the routine 900 waits to receive a downstream information frame.

When an information frame is received (step 915), the routine 900 proceeds to step 920, where a query is made as to whether the information frame is an acknowledgment packet or a data packet.

If the query at step 920 is answered negatively (i.e., the packet is a data packet), then the routine 900 proceeds to step 930, where a receive data routine is performed. The routine 900 then proceeds to step 935, where a query is made as to whether the UID within the received data packet indicates that the packet is intended for the subscriber. If the query at step 935 is answered affirmatively, then the routine proceeds to step 940, where the D-ACK is advanced, thereby indicating to the subscriber (when the DACK is transmitted upstream) that the information frame was successfully received. The routine 900 then proceeds to step 955 and waits for the next downstream information packet to be received. If the query at step 935 is answered negatively, then the routine proceeds directly to step 955.

If the query at step 920 is answered affirmatively (i.e., the packet is an acknowledgment packet), then the routine 900 proceeds to step 945, where a query is made as to whether a collision indicator within the received acknowledged packet indicates that a collision has occurred.

If the query at step 945 is answered negatively, then the routine 900 proceeds to step 950, where the subscriber's transmit buffer is incremented by the amount indicated in the U-ACK field of the acknowledgment packet. The routine 900 then proceeds to step 955 and waits for the next downstream information packet to be received. If the query at step 945 is answered affirmatively (i.e., a collision has occurred), then the routine proceeds directly to step 955.

A number of time-outs are associated with the MAC protocol. These are used to improve the efficiency of the protocol, but do not contribute to the basic protocol correctness. The exemplary time-outs required are as follows:

First, a subscriber unit upstream retransmission timer. This timer is set whenever an upstream packet is sent by the subscriber unit. If there is no acknowledgment by the head end within some time limit the subscriber unit will retransmit the packet.

Second, a subscriber unit upstream ACK timer. This timer is set whenever a downstream packet is received by the subscriber unit. If no upstream data is received from the subscriber unit within some time limit the subscriber unit will send an acknowledgment packet (i.e. repeat the last upstream packet with the correct D-ACK field set).

Third, a head end unit downstream retransmission timer. This timer is set whenever a downstream packet is sent by the head end. If there is no acknowledgment by the subscriber unit within some time limit, the head end unit will retransmit the packet.

Other time-out functions and timers known to those skilled in the art may be utilized to make the operation of the protocol more efficient.

The protocol also provides a limited facility for expedited data upstream. The priority field in the upstream packet is used by the subscriber to indicate to the head end that the data in the packet should be expedited. This information may be used or ignored by the head end depending on the upstream algorithm implemented in the head end.

Although various embodiments which incorporate the teachings of the present invention have been shown and described in detail herein, those skilled in the art can readily devise many other varied embodiments that still incorporate these teachings.

What is claimed is:

1. A media access protocol method for use in an asymmetric information distribution system comprising a plurality of information channels, each information channel comprising a plurality of relatively high bandwidth downstream information slots and at least one relatively low bandwidth upstream slot, each information channel in communication with one or more respective subscribers, said method comprising the steps of:

receiving at a head end, via one or more of said information channel upstream slots, data from one or more subscribers;

determining, for each information channel providing data, if a data collision has occurred;

asserting, for each information channel having a data collision, a data collision indicium in an acknowledgment frame associated with said channel; and transmitting, for each information channel and in a predetermined downstream slot, said acknowledgment frame associated with said channel.

2. The media access protocol method of claim 1, further comprising the steps of:

asserting, for each information channel providing a valid information frame, an acknowledgment indicium in said acknowledgment frame associated with said channel.

3. The media access protocol method of claim 1, further comprising the steps of:

receiving at a subscriber, said transmitted acknowledgment frame;

measuring a reception duration parameter of said transmitted acknowledgment frame; and adjusting, in response to said reception duration parameter, a ranging parameter to temporally align said upstream slot and said predetermined downstream slot used to transmit said respective acknowledgment frame.

4. The media access protocol method of claim 1, further comprising the steps of:

associating with each subscriber a respective memory region;

incrementing, at a rate determined by a subscriber's downstream slot data reception rate, the memory region associated with said subscriber; and decrementing, at a rate determined by said subscriber's upstream slot data transmission rate, the memory region associated with said subscriber.

5. The media access protocol method of claim 4, further comprising the steps of:

allocating additional upstream slot resources to subscribers associated with a memory region having a value exceeding a threshold level.

6. The media access protocol method of claim 5, wherein:

said additional upstream slot resources comprise a reserved upstream slot; and said reserved upstream slot is allocated on a round robin basis to subscribers to an information channel having additional data to transmit.

7. The media access protocol method of claim 6, wherein:

said subscriber condition of having additional data to transmit is indicated in a field of an upstream information frame.

8. A media access protocol method for use in an information distribution system comprising a plurality of information channels, each of said plurality of information channels comprising N relatively high bandwidth downstream information slots, at least one relatively high bandwidth data/control information slot, and at least one relatively low bandwidth upstream slot, each of said plurality of information channels communicating with one or more respective subscribers, said method comprising the steps of:

transmitting, via one or more of said N downstream information slots associated with an information channel, data information frames to said one or more subscribers associated with said information channel; and receiving, via said upstream slot associated with said information channel, upstream information frames providing acknowledgment of said data transmission according to a GoBackN protocol.

9. The media access protocol method of claim 8, further comprising the step of:

transmitting, via said data/control information slot, an acknowledgment frame to said one or more subscribers associated with said information channel, wherein:

said data/control information slot and said upstream slot are temporally aligned; and said acknowledgment frame provides indicia of upstream collision in an aligned upstream slot, and provides acknowledgment of valid reception of an information frame transmitted during a preceding upstream slot.

10. The media access protocol method of claim 9, wherein each data information frame transmitted to a subscriber includes a subscriber identification field for identifying said subscriber, and a downstream sequence field for permitting subscriber reception of a plurality of information frames prior to acknowledging such reception.

11. The media access protocol method of claim 10, wherein each information frame received from a subscriber includes a source identification field for identifying said subscriber, an upstream sequence field for permitting head end reception of a plurality of information frames from the respective subscriber prior to acknowledging such reception, and a downstream acknowledgment field for acknowledging prior information frames received by said subscriber.

12. The media access protocol method of claim 10, wherein each subscriber may receive up to N information frames without acknowledgment.

13. The media access protocol method of claim 11, wherein each subscriber may receive up to N information frames without acknowledgment.

* * * * *